United States Patent [19]

Flynn

[11] Patent Number: 4,609,462
[45] Date of Patent: Sep. 2, 1986

[54] METHOD AND APPARATUS TO CONVERT TOP TUBE SHEET FILTER TO BOTTOM TUBE SHEET FILTER

[75] Inventor: George C. Flynn, Chester, N.J.
[73] Assignee: The Graver Company, Union, N.J.
[21] Appl. No.: 695,041
[22] Filed: Jan. 23, 1985
[51] Int. Cl.$^4$ .............................................. B01D 27/08
[52] U.S. Cl. .................................. 210/232; 210/239; 210/323.2
[58] Field of Search ............... 210/232, 239, 323.2, 210/340, 341, 790, 806, 240

[56] References Cited

U.S. PATENT DOCUMENTS

| | | | |
|---|---|---|---|
| 3,279,608 | 10/1966 | Soriente et al. | 210/232 |
| 3,598,242 | 8/1971 | Mott | 210/323.2 |
| 3,846,307 | 11/1974 | Petrucci et al. | 210/323.2 |
| 4,237,011 | 12/1980 | Acosta | 210/323.2 X |
| 4,283,282 | 8/1981 | Saint-Dizier et al. | 210/323.2 X |
| 4,419,234 | 12/1983 | Miller et al. | 210/232 |
| 4,436,621 | 3/1984 | Picker | 210/232 |

Primary Examiner—Thomas Wyse
Attorney, Agent, or Firm—Dressler, Goldsmith, Shore, Sutker & Milnamow

[57] ABSTRACT

A method and apparatus to convert a top tube sheet precoat filter apparatus to a bottom tube sheet precoat filter apparatus. A cannister member is supported within the existing filter tank in place of the existing tube sheet dividing the filter tank into an upper influent compartment and a lower effluent compartment. A plurality of precoat filter elements extend upwardly from the lower end of the cannister member into the influent compartment. An influent conduit directs liquid to be treated into the influent compartment and an effluent conduit withdraws treated liquid from the effluent compartment. The existing influent conduit is utilized as the effluent conduit and the existing drain is modified for utilization as the influent conduit. A gas surge conduit and vent are provided to permit utilization of the gas scour backwash technique.

25 Claims, 2 Drawing Figures

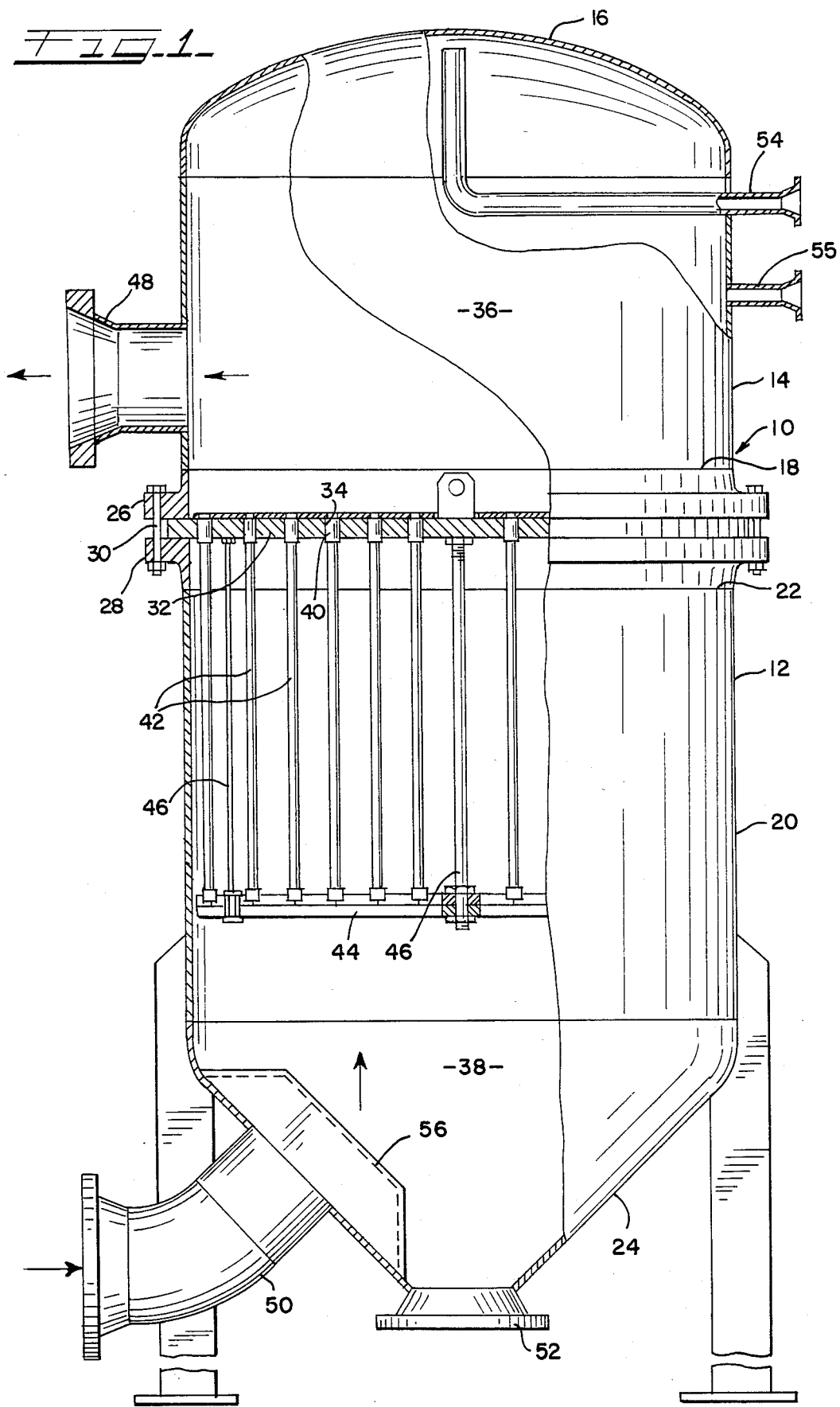

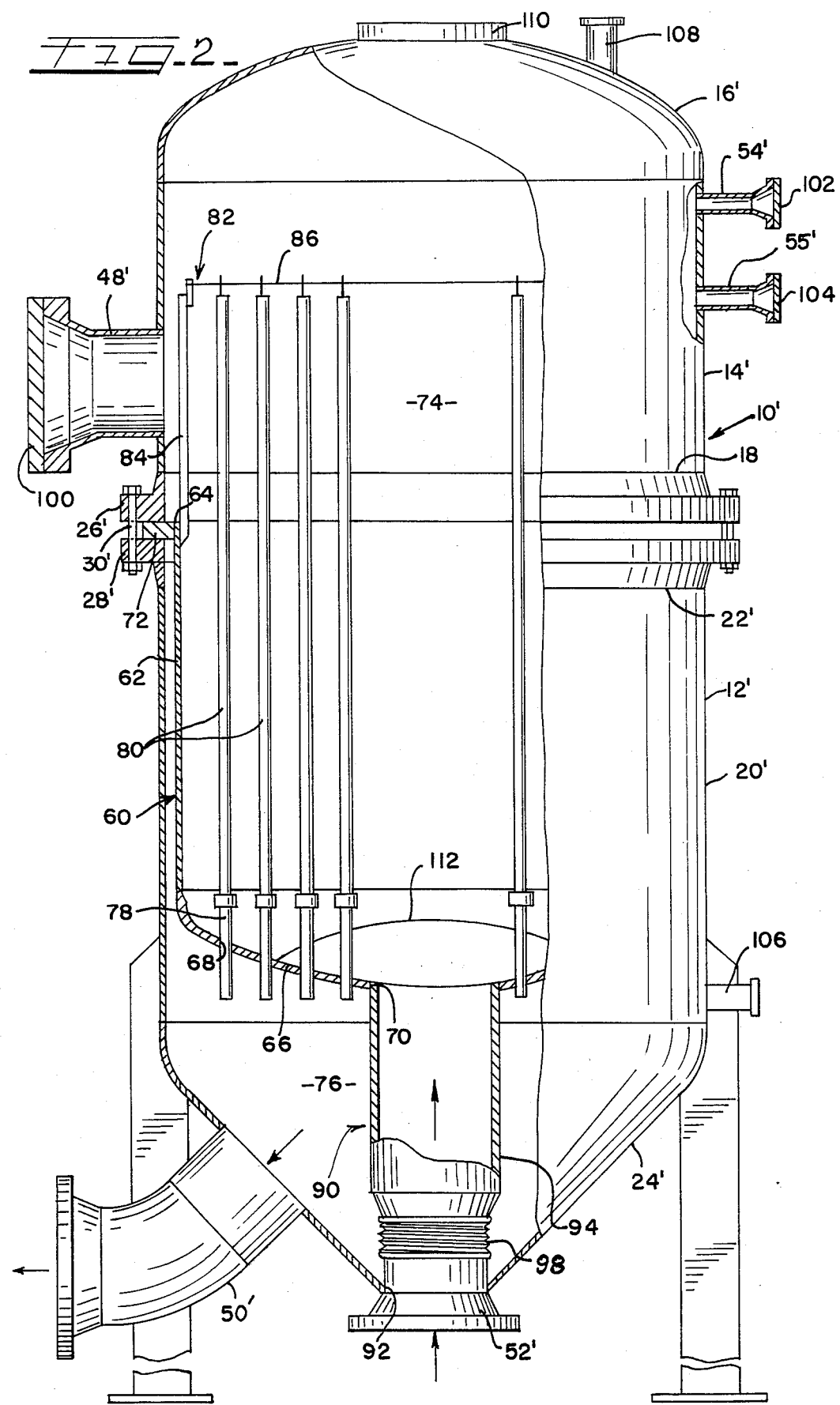

METHOD AND APPARATUS TO CONVERT TOP TUBE SHEET FILTER TO BOTTOM TUBE SHEET FILTER

BACKGROUND OF THE INVENTION

The present invention is directed to a method and apparatus for converting a top tube sheet precoat filter apparatus to a bottom tube sheet precoat filter apparatus.

Precoat filter apparatus of the top tube sheet design are well known in the art. The typical top tube sheet precoat filter apparatus includes a filter tank which is divided into an upper effluent compartment and a lower influent compartment by a generally horizontal tube sheet secured in place at the intersection between the upper and lower sections thereof. A plurality of downwardly extending precoat filter elements are suspended from the tube sheet within the influent compartment in fluid communication with openings formed in the tube sheet. An influent conduit directs liquid to be treated into the lower influent compartment and an effluent conduit directs treated liquid from the upper effluent compartment. The filter elements used in this design are of the stainless steel mesh or wire wound type which have provided notably poor performance in critical treatment applications, such as main condensate polishing at nuclear power stations. Such poor performance is as a consequence of precoat material leakage, poor precoat material utilization due to ineffective distribution of the precoat material onto the filter elements, and ineffective removal of spent precoat material from the filter elements due to utilization of a sub-standard backwash technique known as "air bump", which is necessarily employed with this filter apparatus design.

Precoat filter apparatus of the bottom tube sheet design are also well known in the art, an example of which is disclosed in U.S. Pat. No. 3,715,033, assigned to the same assignee as the present invention. The typical bottom tube sheet precoat filter apparatus includes a filter tank which is divided into an upper influent compartment and a lower effluent compartment by a generally concave tube sheet secured in place in a lower portion of the filter tank. A plurality of precoat filter elements extend upwardly from the tube sheet within the upper influent compartment in fluid communication with openings formed in the tube sheet. An influent conduit extends upwardly through openings in the bottom of the filter tank and the tube sheet for directing liquid to be treated into the upper influent compartment and an effluent conduit directs treated liquid from the lower effluent compartment. The filter elements utilized in this design are of the fiber-wound type. These filter elements substantially eliminate precoat material leakage and achieve improved precoat material utilization due to superior distribution of the precoat material on the filter elements. Further, this design typically utilizes the backwash technique known as "air surge" which maintains a superior condition of the filter elements.

SUMMARY OF THE INVENTION

The present invention is directed to a method and apparatus for converting an existing top tube sheet precoat filter apparatus to a bottom tube sheet precoat filter apparatus within the existing filter tank so as to be able to employ fiber-wound filter elements and utilize the "air surge" backwash technique.

Briefly, in accordance with the method of the present invention an existing top tube sheet precoat filter apparatus is converted to a bottom tube sheet precoat filter apparatus by removing the existing tube sheet and filter elements from the filter tank. A cannister member, having an open upper end and a closed lower end, is supported within the filter tank such that the upper end thereof is in sealing contact with an inner surface of the filter tank and the lower end thereof extends substantially across the filter tank and functions as a tube sheet dividing the filter tank into an upper influent compartment and a lower effluent compartment. In accordance with the preferred method, the upper end of the cannister member is provided with an annular flange which is sandwiched between annular flanges associated with upper and lower sections of the filter tank.

A plurality of precoat filter elements are supported within the filter tank and extend upwardly from the lower end of the cannister member into the upper influent compartment in fluid communication with openings in the lower end of the cannister member. In accordance with the preferred method, the filter elements are secured to fittings associated with the openings in the lower end of the cannister member and sway bars are provided for retaining the upper ends of the filter elements.

An influent conduit is provided to direct influent liquid into the upper influent compartment. In accordance with the preferred method, the drain conduit is converted to function as the influent conduit by providing an extension conduit, having an upper end secured to the lower end of the cannister member in communication with an opening therethrough, and a lower end secured to the drain conduit through a flexible coupling joint. An effluent conduit is provided for withdrawing treated liquid from the lower effluent compartment. In accordance with the preferred method, the existing influent conduit of the top tube sheet precoat filter apparatus is utilized as the effluent conduit. The existing effluent conduit and backwash conduits are closed off.

In order to permit utilization of the air surge backwash technique, suitable air surge backwash inlet and outlet conduits are provided in communication with the filter tank. Further, an inlet baffle may be provided within the upper influent compartment in facing relationship with the influent conduit.

In accordance with the apparatus of the present invention, a bottom tube sheet precoat filter apparatus is provided which includes a generally vertical filter tank having an upper section and a lower section. A generally vertical cannister member is supported within the filter tank. The cannister member has an open upper end in sealing contact with the filter tank and a closed lower end having openings formed therein so as to divide the filter tank into an upper influent compartment and a lower influent compartment. A plurality of precoat filter elements extend upwardly from the lower end of the cannister member into the upper influent compartment in fluid communication with the openings in the lower end of the cannister member. An influent conduit is provided to direct influent liquid into the upper influent compartment and an effluent conduit is provided for withdrawing effluent liquid from the lower effluent compartment.

In accordance with a preferred embodiment of the apparatus of the invention, the adjacent edges of the upper and lower sections have first and second annular flanges associated therewith and the upper end of the cannister member has a third annular flange associated therewith; the third annular flange being sandwiched between the first and second annular flanges. The influent conduit includes a generally vertical extension conduit within the lower effluent compartment, having an upper end in fluid communication with the influent compartment through an opening in the lower end of the cannister member and a lower end in fluid communication with an opening in a lower portion of the effluent compartment through a flexible joint fitting. The filter elements are secured to the lower end of the cannister member through fittings extending therethrough. Further, sway bar members may be provided to retain the upper ends of the filter elements and an inlet baffle may be provided within the upper influent compartment to distribute the influent liquid flow. Air surge backwash inlet and outlet conduits are provided in fluid communication with the filter tank in order to premit utilization of the air surge backwash technique.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate parts throughout the same, FIG. 1 is a sectional, diagramatic elevational view of a typical top tube sheet filter apparatus; and FIG. 2 is a sectional, diagramatic elevational view of a filter apparatus of the type shown in FIG. 1 which has been converted to a bottom tube sheet filter apparatus in accordance with the method and apparatus of the present invention.

DETAILED DESCRIPTION OF THE PREFERRED EMBODIMENTS

While this invention is susceptible of embodiment in many different forms, this specification and the accompanying drawings disclose only some specific forms as examples of the use of the invention. The invention is not intended to be limited to the embodiments so described, and the scope of the invention will be pointed out in the appended claims.

The apparatus of this invention has certain conventional components the details of which, although not fully illustrated or described, will be apparent to those having skill in the art and an understanding of the necessary functions of such components. The precise shapes and sizes of the components herein described are not essential to the invention unless otherwise indicated.

The figures illustrating the preferred embodiments of the apparatus show structural details and mechanical elements that will be recognized by one skilled in the art. However, the detailed descriptions of such elements are not necessary to an understanding of the invention, and accordingly, are not herein presented.

Referring to FIG. 1, a typical top tube sheet precoat filter apparatus is shown of the general type to which the present invention is directed to improve upon by the conversion thereof to a bottom tube sheet filter apparatus. The filter apparatus is designated generally by the reference numeral 10 and includes a filter tank 12, which is typically of generally vertical cylindrical configuration. Filter tank 12 is configured from an upper section 14, having a closed off upper head portion 16 and an open ended lower portion 18, and a lower section 20, having an open ended upper portion 22 in facing alignment with portion 18 and an inwardly sloping lower portion 24. The respective upper and lower sections 14 and 20 are respectively provided with annular flanges 26 and 28 extending outwardly adjacent the open ends thereof. Flanges 26 and 28 are typically provided with aligned openings formed therein for receipt of fastening means 30 therethrough.

A substantially horizontal plate or tube sheet 32 is positioned within filter tank 12 such that the outer edges thereof are received and retained in place between flanges 26 and 28 through a generally horizontal plane therebetween. Tube sheet 32, formed with openings 34 extending therethrough, divides the filter tank 12 into an upper effluent compartment 36 and a lower influent compartment 38. A filter element receiving fitting 40, of well known construction, extends through openings 34.

A plurality of filter elements 42 are supported from fittings 40 and extend downwardly into influent compartment 38. Filter elements 42 are typically of the stainless mesh or wire wound type, an example of which is disclosed in U.S. Pat. No. 3,779,386. The lower ends of the filter elements 42 are retained in place by a sway bar arrangement, indicated generally at 44, which is suspended from tube sheet 32 by supporting members 46.

An effluent conduit 48 extends outwardly from the upper section 14 of filter tank 12 in fluid communication with the interior of effluent compartment 36 for withdrawing the treated liquid therefrom. An influent conduit 50 extends outwardly from the lower portion 24 of section 20 in fluid communication with influent compartment 50. A drain fitting 52 extends from the lowermost end of lower portion 24 through which the filter tank 12 may be drained. Vent conduit 54 extends into effluent compartment 36 as shown in FIG. 1 and a drain conduit extends downwardly from upper section 14. An influent baffle 56 is mounted within influent compartment 38 in facing relationship with influent conduit 50.

The brief description of the operation of filter apparatus 10 which hereinbelow follows is for the purpose of setting forth the general nature of such operation and is not intended to be a detailed disclosure of such operation, which is well known to those skilled in the art. In operation, the outer surfaces of the filter elements 42 are precoated with a precoat layer of particles, such as finely divided ion exchange resin particles, by passing a slurry of such particles into and through influent compartment 38 such that the particles attach to and form a precoat layer on the outer surface of the filter elements. During the service cycle, untreated liquid is directed through influent conduit 50 into influent compartment 38. The pressure of the incoming untreated liquid forces it through the precoat layer, the filter elements 42, and the effluent compartment 36 into the effluent conduit 48. As the untreated liquid passes through the precoat layer, an ion exchange reaction takes place to remove dissolved impurities from the liquid. In addition, undissolved impurities are removed from the untreated liquid by virtue of the liquid passing through the precoat layer of finely divided resin particles and filter elements 42. A filter cake, consisting of undissolved impurities, builds up within and on the precoat layer as the service cycle continues. As is well known in the art, the precoat layer may contain various combinations of reactive materials, such as ion exchange resins, activated carbon etc., and non-reactive materials.

Eventually, the precoat layer will become exhausted and must be thoroughly removed and discarded. At such time, the service cycle is stopped and it is necessary to clean the filter elements 42, by removing the filter cake and the precoat layer therefrom during a backwash cycle, before the filter elements 42 are once again precoated and returned to service. During the backwash cycle, the liquid in the filter tank 12 is drained down through drain conduit 55 and the void space thereabove is pressurized through the addition of pressurized gas into filter tank 12. The drain conduit 52 is then opened and the backwash liquid in the filter tank is rapidly drained with the assistance of the pressurized gas therein to dislodge and remove the filter cake and precoat layer from the filter tank.

As alluded to hereinabove, the present invention is directed to a method and apparatus for converting a top tube sheet precoat filter apparatus of the type as generally shown in FIG. 1, and hereinabove described, into a bottom tube sheet precoat filter apparatus within the existing filter tank. The description of a preferred method and apparatus of the invention for such conversion which hereinbelow follows makes reference to FIG. 2, wherein the corresponding structural members in FIG. 2 are identified by the same reference numeral as in FIG. 1 followed by a prime (') designation.

Referring to FIG. 2, the bottom tube sheet precoat filter apparatus of the present invention is designated at 10'. Filter apparatus 10' includes a filter tank 12' having the same configuration as filter tank 12 in FIG. 1. That is, filter tank 12' includes an upper secton 14', having a closed off upper head portion 16' and an open ended lower portion 18', and a lower section 20', having an open ended upper portion 22' and an inwardly sloping lower portion 24'. Annular flanges 26' and 28' are provided for receiving fastener means 30' therethrough.

A generally vertical cannister member 60 is positioned and supported within filter tank 12'. Cannister member 60 is a cylindrical structure defined by a side wall 62, an open end portion 64 and a closed lower end portion 66. Lower end portion 66 is preferably of concave shape and of increased thickness, as shown in FIG. 2. Lower end portion 66 is formed with a plurality of spaced apart openings 68 and a central opening 70 formed therein. The upper end 64 is provided with an outwardly extending annular flange 72 which is received and secured in place between flanges 26' and 28' in sealing contact with filter tank 12'. Cannister member 60 divides filter tank 12' into an upper influent compartment 74 and a lower effluent compartment 76, with lower end portion 66 serving as a tube sheet therebetween as will hereinbelow become more apparent.

A plurality of filter element receiving fittings 78, of well known construction, extend through openings 68, an example of which is disclosed in U.S. Pat. No. 4,174,282. Precoat filter elements 80 are supported from fittings 78 and extend upwardly into upper influent compartment 74. Filter elements 80 are preferably of the fiber-wound type, an example of which is disclosed in U.S. Pat. No. 4,269,707. The upper ends of the filter elements 80 are preferably retained in place by a suitable sway bar arrangement 82 extending upwardly from cannister member 62. The exemplary sway bar arrangement as shown in FIG. 2 includes a plurality of spaced apart brace members 84 which extend upwardly from the upper end 64 of cannister member 60, from which a network of sway bars 86 are supported which receive and retain the upper ends of the filter elements 80 in a suitable and well known manner.

An influent conduit 90 extends from opening 70 in cannister member 60 through an opening 92 in lower section 20'. In accordance with the preferred embodiment of the invention, influent conduit 90 includes an extension conduit 94 having an upper end in communication with opening 70 and a lower end that is secured to a fitting 52' which is secured to and extends through opening 92. Extension conduit 94 is preferably secured to pipe fitting 96 through a flexible joint coupling 98 of well known design.

The effluent conduit 48' and conduits 54' and 55' are respectively capped off by cap members 100, 102 and 104. A gas surge inlet conduit 106, in communication with a source of pressurized gas (not shown), is provided through section 20' of filter tank 12' to direct pressurized gas into effluent compartment 76. A suitable vent 108 and a manway opening and cover arrangement 110 are provided in head portion 16', as shown in FIG. 2. As will hereinbelow be further discussed, the influent conduit 50 is converted to function as an effluent conduit 50' of the filter apparatus 10'. An influent baffle 112 is preferably provided within cannister member 60 in facing relationship to influent conduit 90.

In accordance with the method of the present invention, the top tube sheet precoat filter apparatus 10 is converted to bottom tube sheet precoat filter apparatus 10' as hereinbelow discussed. The system piping leading to and extending from filter 10' is disconnected and the upper section 14 is dismantled from the lower section 20 by removing fasteners 30. The tube sheet 32, filter elements 42, sway bar 44, supporting members 46, influent baffle 56 and the portion of vent conduit 54 which extends into filter tank 12 are removed. Cannister member 60, having fittings 78, influent baffle 112, and extension conduit 94 secured in place, is positioned within lower section 20 with flange 72 resting on flange 28. The filter elements 80 are installed in fittings 78 and the sway bar arrangement 82 is secured in place. The upper section 14 is positioned above section 20 and the fasteners 30 are tightened sandwiching flange 30 between flanges 26 and 28.

The extension conduit 94 is connected to fitting 52 through the flexible coupling joint 98 to form influent conduit 90. A gas surge conduit 106 is secured to section 20 in communication at one end with an upper portion of compartment 76 and at its other end to a source of pressurized gas (not shown). A gas vent 108 is secured to head portion 16 in communication with influent compartment 74. A covered manway opening 110 may also be provided through head portion 16. Conduits 48, 54 and 55 are respectively capped off by cap members 100, 102 and 104. Filter apparatus 10' is suitably piped in the system in a well known manner such that effluent conduit 50' is utilized to withdraw treated liquid from effluent compartment 76 during the service cycle and to direct backwash liquid into the effluent compartment 76 during the backwash cycle. Likewise, influent conduit 90 is piped in the system such that it is utilized to direct liquid to be treated into the influent compartment 74 during the service cycle and to withdraw backwash liquid from the effluent compartment during the backwash cycle.

The brief description of the operation of filter apparatus 10' which hereinbelow follows is for the purpose of setting forth the general nature of such operation and is not intended to be a detailed disclosure of such operation, which is well known to those skilled in the art. In operation, the outer surfaces of the filter elements 42' are precoated with a precoat layer of particles, such as finely divided ion exchange resin particles, by passing a slurry of such particles through influent conduit 90 into influent compartment 74 such that the particles attach to and form a precoat layer on the outer surface of the filter elements. During the service cycle, untreated liquid is directed through influent conduit 90 into influent compartment 74. The pressure of the incoming untreated liquid forces it through the precoat layer, the filter elements 42', and the effluent compartment 76 into the effluent conduit 50'. As discussed above with regards to operation of filter apparatus 10, dissolved and undissolved impurities are removed from the untreated liquid as it passes through the precoat layer and the filter elements 42'.

Eventually, the precoat layer becomes exhausted and must be thoroughly removed and discarded. At such time, the service cycle is stopped and it is necessary to clean the filter elements 42', by removing the filter cake and the precoat layer therefrom during a backwash cycle. During the backwash cycle, the vent 108 is opened and the influent compartment 74 is drained through conduit 90. To remove the filter cake and the precoat layer from the filter elements 42', the conduit 90 is suitably closed and a mixture of pressurized gas (air) and water are passed through them in reverse flow to normal operation. To accomplish this, air is introduced into the effluent compartment 76 through conduit 106. Simultaneously, water is directed into the effluent compartment 76 through conduit 50'. As the air-water mixture enters the interior of the filter elements 42', the finely divided resin particles, together with the constituents of the filter cake, are removed by the combined effect of agitated liquid and collapsing air bubbles as the air-water mixture passes out through the walls of the filter elements 42'. After a period of time, the delivery of water into the effluent compartment 76 is haulted and the conduit 90 is suitably opened to drain influent compartment 74. The delivery of air into the effluent compartment 76 is preferably continued during the draining of the influent compartment 74. After the influent compartment 74 has been drained, the conduit 90 is suitably closed, and the aforementioned cleaning procedure is repeated a sufficient number of times to thoroughly clean the filter elements 42'. The filter elements 42' are now ready to be precoated and the filter apparatus 10' returned into service.

It will be readily observed from the foregoing detailed description of the invention and from the drawings that numerous variations and modifications may be effected without departing from the true spirit and scope of the novel concepts or principles of this invention.

What is claimed is:

1. A method of converting a top tube sheet precoat filter apparatus into a bottom tube sheet precoat filter apparatus, comprising the steps of:
    (a) providing a top tube sheet precoat filter apparatus having,
        (i) a filter tank having an upper effluent compartment and a lower influent compartment,
        (ii) a tube sheet mounted in said filter tank dividing the filter tank into the upper and lower compartments,
        (iii) filter elements extending downwardly from the tube sheet into the influent compartment in fluid communication with corresponding openings in the tube sheet,
        (iv) an inlet conduit for directing influent liquid into the lower influent compartment, and
        (v) an effluent conduit for withdrawing effluent liquid from the upper effluent compartment;
    (b) removing the tube sheet and the filter elements from the filter tank;
    (c) supporting a cannister member, having an open upper end and a closed lower end, within the filter tank such that the upper end thereof is in sealing contact with the inner surface of the filter tank and the lower end thereof extends substantially across the filter tank and functions as a tube sheet dividing the filter tank into an upper influent compartment and a lower effluent compartment;
    (d) supporting precoat filter elements upwarding from the lower end of the cannister member within the upper influent compartment in fluid communication with openings in the lower end of the cannister member;
    (e) providing an influent conduit for directing influent liquid into the upper influent compartment; and
    (f) providing an effluent conduit for withdrawing effluent liquid from the lower effluent compartment.

2. The method as defined in claim 1 wherein the filter tank of the top tube sheet precoat filter apparatus provided in step (a) has an upper section defining the upper effluent compartment and a lower section defining the lower influent compartment and the tube sheet is secured to and separates the upper and lower sections and wherein the upper end of the cannister member supported in step (c) is in sealing contact at the intersection between the upper and lower sections of the filter tank.

3. The method as defined in claim 2 wherein the upper and lower sections of the filter tank respectively have first and second cooperating annular flanges and the upper end of the cannister member is provided with a third annular flange which is sandwiched between the first and second annular flanges.

4. The method as defined in claim 1 further including the step of converting the influent conduit of the top tube sheet precoat filter apparatus provided in step (a) to function as the effluent conduit as set forth in step (f).

5. The method as defined in claim 1 wherein the filter tank provided in step (a) has a drain conduit to drain the lower influent compartment and further including the step of converting the drain conduit to function as the influent conduit as set forth in step (e).

6. The method as defined in claim 5 wherein the step of converting the drain conduit to function as the influent conduit includes the step of providing an extension conduit having an upper end secured to the lower end of the cannister member in communication with an opening therethrough and a lower end secured to the drain conduit.

7. The method as defined in claim 6 further including the step of providing a flexible coupling joint between the lower end of the extension conduit and the drain conduit.

8. The method as defined in claim 1 further including the step of closing off the effluent conduit of the top tube sheet precoat filtration apparatus provided in step (a).

9. The method as defined in claim 1 further including the step of providing an inlet baffle within the cannister member in facing relationship with the influent conduit as set forth in step (e).

10. The method as defined in claim 1 further including the step of extending fittings through the openings in the lower end of the cannister member for releasably receiving the lower ends of the filter elements as set forth in step (d).

11. The method as defined in claim 10 further including the step of attaching sway bars for retaining the upper ends of the filter elements as set forth in step (d).

12. The method as defined in claim 11 further including the step of providing a gas surge inlet conduit for directing pressurized gas into the lower effluent compartment.

13. The method as defined in claim 12 further including the step of providing a vent conduit for venting gas from the upper influent compartment.

14. A bottom tube sheet precoat filter apparatus, comprising: a generally vertical filter tank having an upper section and a lower section, said upper and lower sections being secured to each other through a substantially horizontal plane intermediate the upper and lower ends of said filter tank; a generally vertical cannister member supported within said filter tank, said cannister member having an open upper end in sealing contact with said filter tank and a closed lower end having openings formed therein so as to divide said filter tank into an upper influent compartment and a lower effluent compartment; a plurality of precoat filter elements extending upwardly from the lower end of said cannister member into said upper influent compartment in fluid communication with said openings in said lower end of said cannister member; an influent conduit for directing influent liquid into said upper influent compartment; and an effluent conduit for withdrawing effluent liquid from said lower effluent compartment.

15. The apparatus as defined in claim 14 wherein said upper end of said cannister member is in contact with and secured to said filter tank through said substantially horizontal plane.

16. The apparatus as defined in claim 15 wherein first and second annular flanges are provided respectively at the intersecting edges of said upper and lower sections of said filter tank and a third annular flange is provided at the upper end of said cannister, said third annular flange being sandwiched between said first and second annular flanges in a sealing relationship thereto.

17. The apparatus as defined in claim 14 wherein said effluent conduit is in fluid communication with a lower portion of said effluent compartment.

18. The apparatus as defined in claim 14 wherein said influent conduit includes a generally vertically extending extension conduit within said effluent compartment, having an upper end in fluid communication with said influent compartment through an opening in said lower end of said cannister member and a lower end in fluid communication with an opening through a lower portion of said effluent compartment.

19. The apparatus as defined in claim 18 wherein said influent conduit further includes a flexible joint coupling extending between said extension conduit and a fitting associated with said opening through said effluent compartment.

20. The apparatus as defined in claim 14 wherein an inlet baffle is provided within said cannister member in facing relationship to said influent conduit.

21. The apparatus as defined in claim 14 further including fittings extending through said openings in said cannister member for releasably receiving the lower ends of said precoat filter elements.

22. The apparatus as defined in claim 21 further including sway bar members for retaining the upper ends of said filter elements.

23. The apparatus as defined in claim 22 wherein said sway bar members are supported above the upper edge of said cannister member by upwardly extending brace members secured to said cannister member.

24. The apparatus as defined in claim 14 further including a gas surge inlet conduit in fluid communication with said effluent compartment for directing pressurized gas thereinto.

25. The apparatus as defined in claim 14 further including a vent conduit for venting gas from said influent compartment.

* * * * *